US012616627B2

(12) United States Patent
Kenoe

(10) Patent No.: US 12,616,627 B2
(45) Date of Patent: May 5, 2026

(54) ASYMMETRICAL WALKER GLIDES WITH IMPROVED STABILITY

(71) Applicant: Tip Less LLC, Northbrook, IL (US)

(72) Inventor: Andrew S. Kenoe, Northbrook, IL (US)

(73) Assignee: TIP LESS LLC, Northbrook, IL (US)

( * ) Notice: Subject to any disclaimer, the term of this patent is extended or adjusted under 35 U.S.C. 154(b) by 224 days.

(21) Appl. No.: 18/748,813

(22) Filed: Jun. 20, 2024

(65) Prior Publication Data

US 2024/0423865 A1 Dec. 26, 2024

Related U.S. Application Data

(60) Provisional application No. 63/522,318, filed on Jun. 21, 2023.

(51) Int. Cl.
*A47B 91/06* (2006.01)
*A45B 9/04* (2006.01)
*A61H 3/02* (2006.01)

(52) U.S. Cl.
CPC ............. *A61H 3/0288* (2013.01); *A45B 9/04* (2013.01); *A47B 91/06* (2013.01)

(58) Field of Classification Search
CPC ........ A61H 3/0288; A61H 3/04; A47B 91/06; B62B 19/04
USPC ............................................................ 135/67
See application file for complete search history.

(56) References Cited

U.S. PATENT DOCUMENTS 4,098,283 A * 7/1978 Tritle, Jr. ................. A45B 9/04 135/77
4,411,283 A * 10/1983 Lucarelli .................. A61H 3/00 16/42 T
5,224,506 A * 7/1993 Allen ....................... A61H 3/04 16/42 T
5,782,256 A 7/1998 Bradley
5,911,235 A 6/1999 Henderson et al.
D442,123 S * 5/2001 Johnston ...................... D12/133
8,789,547 B1 * 7/2014 Reda .................... A61H 3/0288 135/77
10,039,688 B1 * 8/2018 Epp .......................... A61H 3/04
12,479,493 B2 * 11/2025 Chaudeurge ............ B62B 19/02
2007/0169308 A1 * 7/2007 Chiu .................... A61H 3/0288 16/42 R (Continued)

OTHER PUBLICATIONS

Centers for Disease Control and Prevention, 47,000 Older Adults Treated in Emergency Departments Annually for Fall Injuries Related to Walkers and Canes (Jun. 29, 2009), https://www.cdc.gov/media/pressrel/2009/r090629.htm.

(Continued)

*Primary Examiner* — Robert Canfield
(74) *Attorney, Agent, or Firm* — KATTEN MUCHIN ROSENMAN LLP

(57) ABSTRACT

Disclosed is a device related to walker glides. The pair of walker glides has an asymmetric design for improving the stability of a walker. The glide may comprise a seat configured for gliding on various surfaces, and a sleeve positioned on top of the seat for slidably mounting the glide on a rear walker leg. In the medial-to-lateral direction, the sleeve, which is the area of support for each rear walker leg, is positioned closer to the medial side of the seat than the lateral side of the seat, which results in an asymmetric configuration for the pair of walker glides.

8 Claims, 7 Drawing Sheets

(56) References Cited

U.S. PATENT DOCUMENTS

| | | | |
|---|---|---|---|
| 2009/0078296 A1 | 3/2009 | Diamond | |
| 2010/0229346 A1 | 9/2010 | Chiu | |
| 2014/0090678 A1 | 4/2014 | Taylor et al. | |
| 2018/0221238 A1 | 8/2018 | Epp | |
| 2018/0242700 A1 | 8/2018 | Kudronowicz | |
| 2022/0339054 A1 | 10/2022 | Rock | |
| 2023/0136051 A1 | 5/2023 | Sullivan et al. | |
| 2024/0000650 A1* | 1/2024 | Scott .................... | A61H 3/0288 |

OTHER PUBLICATIONS

Eustice, C. Elderly Falls Tied to Canes and Walkers: Tips for Safe Use, Verywell Health (Feb. 25, 2022), https://www.verywellhealth.com/elderly-falls-tied-to-canes-and-walkers-2552063.

Walker Glide Skis for 7/8" for 4095 Walker, Gray—Nova Medical Products (Dec. 8, 2022), https://web.archive.org/web/20221208030959/https://novajoy.com/products?categoryId=30&productId=238.

International Search Report and Written Opinion mailed Sep. 19, 2024, from International Application No. PCT/US2024/034739, 12 sheets.

* cited by examiner

ASYMMETRICAL WALKER GLIDES WITH IMPROVED STABILITY

CROSS-REFERENCE TO RELATED APPLICATIONS

This application claims priority to U.S. Provisional Application Ser. No. 63/522,318, filed Jun. 21, 2023, the entire contents of which are hereby incorporated by reference in their entirety.

FIELD OF THE INVENTION

The present invention relates to medical mobility devices and, in particular, to walker glides.

BACKGROUND

Walkers are devices that provide support during movement. Walkers are typically used by people with limited mobility or functionality. For instance, they may be used by people who need assistance while walking due to advanced age, injury, or weakness as a result of an underlying medical condition. A typical walker has a frame structure with front and rear legs. Its rear legs are typically equipped with rubber tips, which do not glide easily over carpeting or area rugs or over rough or uneven surfaces (e.g., cracked and/or pocked concrete and asphalt surfaces). Rubber tips often hinder movement and do not enhance the stability of the walker.

Accidents resulting from walker use have been a significant problem. The CDC estimates that between 2001 and 2006, each day there were about 129 adults in the age group of 65+ who were treated in emergency departments across the US for injuries due to accidents involving walkers and canes. This adds up to a total of more than 47,000 each year. Notably, 87 percent of these accidents were attributable to walker use. The problem is further illustrated by the fact these injuries most commonly resulted in fractures (38 percent) and about a third of all injuries from falls involving walkers were to the lower trunk (e.g., to the hip or pelvis). One in three people whose fall involved a walker had to be hospitalized. Centers for Disease Control and Prevention, 47,000 Older Adults Treated in Emergency Departments Annually for Fall Injuries Related to Walkers and Canes (Jun. 29, 2009), https://www.cdc.gov/media/pressrel/2009/r090629.htm; See also Eustice, C. Elderly Falls Tied to Canes and Walkers: Tips for Safe Use, Verywell Health (Feb. 25, 2022), https://www.verywellhealth.com/elderly-falls-tied-to-canes-and-walkers-2552063. The need for improving stability of walkers continues to exist and is addressed by the present invention.

SUMMARY

In general, this disclosure is directed to an asymmetrically designed pair of walker glides mountable on the rear legs of a walker. The asymmetrical design of the pair of walker glides improves the stability of a walker.

In certain embodiments, the glide includes a sleeve for mounting the glide on a walker leg, a seat that is designed for gliding on the ground, and fastening means including a screw, a washer and a nut that hold the sleeve and the seat together. Typically, the seat has a flat portion with a smooth bottom surface, and a raised tip (similar to a ski tip) at the front. The sleeve is positioned on the seat closer to one side of the seat such that side-to-side an asymmetric design is achieved making the seat of the glide wider on one side of the sleeve (the lateral side) than on the other side of the sleeve (the medial side). The glides provide added stability to a walker when mounted on a walker because the wider part of the seat is located laterally, and the narrower part of the seat is located medially. The details of different embodiments are set forth in the accompanying drawings and the description below. Other features, objects, and advantages of the disclosed embodiments will be apparent from the description and drawings, and from the claims.

Figure 1A:
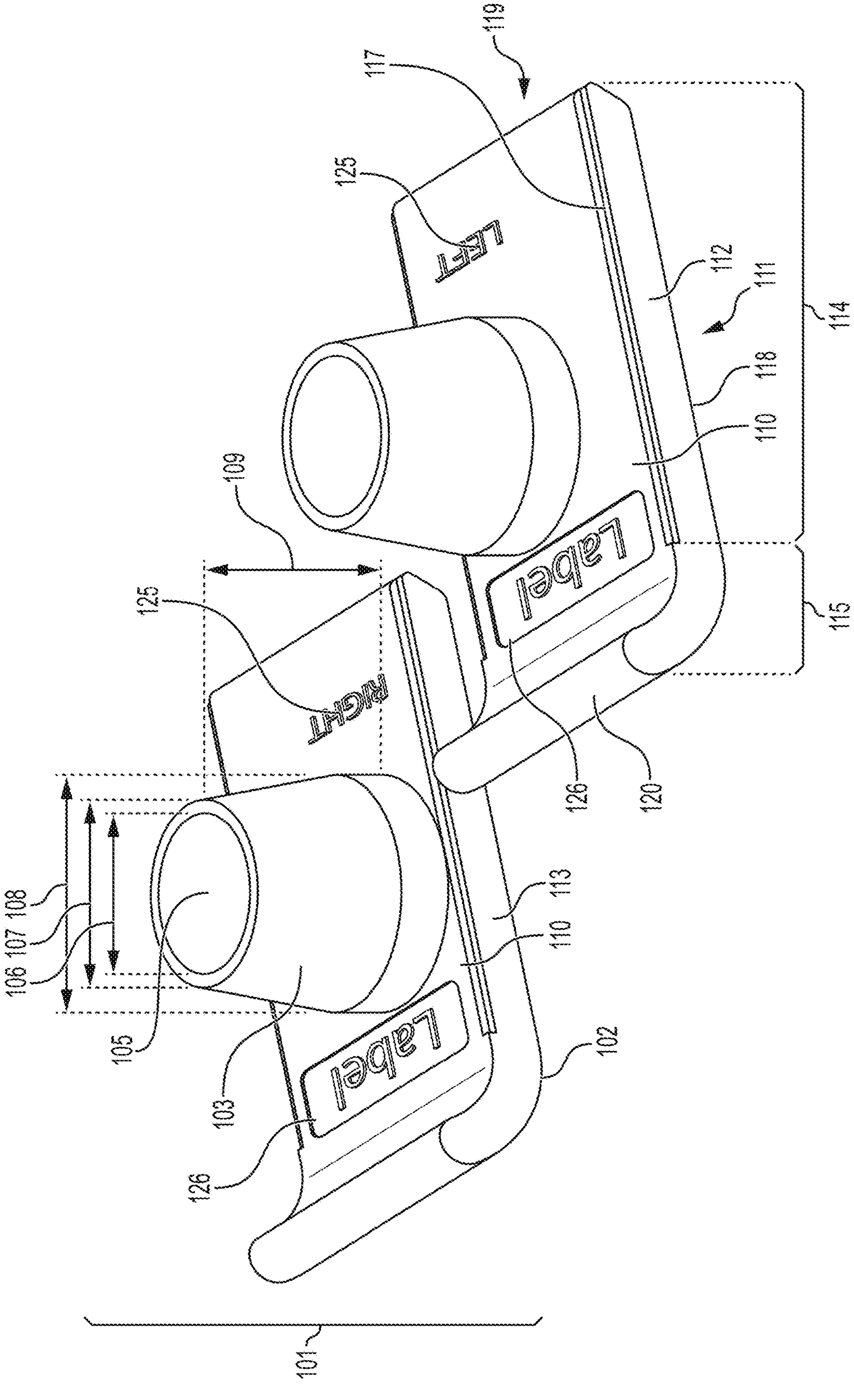
FIG. 1A shows a perspective view of a pair of glides in accordance with an embodiment of the present invention.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Stability of a walker can be improved by equipping it with glides, which provide an increased contact surface area with the ground. In some embodiments, as shown in FIGS. 1A-4, the glide 101 has an elongated seat 102 and a sleeve 103 for mounting the glide on a walker leg.

According to certain embodiments of the present invention, as shown in FIGS. 1A-4, the outside 104 of the sleeve 103 has the shape of a truncated cone which has a larger base and a smaller top with a cylindrical hole. This hole opens to a hollow cavity 105 inside of the sleeve for the insertion of a walker leg, which hollow cavity is configured such that the sleeve fits snugly over the outside circumference of the walker leg. This hollow cavity has a cylindrical shape with an internal diameter 106 that is slightly smaller than the outer diameter of the walker leg. The outside dimensions of the sleeve can be defined by the following: an outer base circumference of the sleeve 107, an outer base diameter 406, an outer top circumference of the sleeve 108, an outer top diameter 202, a height 109, and a center point of the base 405. In general, the outer base circumference of the sleeve 107 is larger than the top circumference of the sleeve 108. The sleeve has a height 109 that is optimized to allow a sufficient hold between the between the sleeve and the outside diameter of the walker leg. In one example, the sleeve has an inner diameter of about 1.125 inches, an outer top diameter of about 1.25 inches, an outer base diameter of about 1.625 inches, and height of about 1.5 inches.

In some embodiments, the sleeve is made of a material having a degree of elasticity sufficient for the sleeve to stretch in diameter to the size of the outer diameter of the walker leg, thus allowing the sleeve and the glide to be slidably mountable on said walker leg. The material has a degree of elasticity further sufficient to ensure that the sleeve and the glide remain mounted on the walker leg during use by means of pressure and friction applied by the sleeve to the outer diameter of the walker leg. In some embodiments, the sleeve can be made of rubber or similar material. However, in other embodiments the sleeve can be made of alternative materials known in the art including, but not limited to, a polymer (a plastic) or similar material.

Figure 1C:
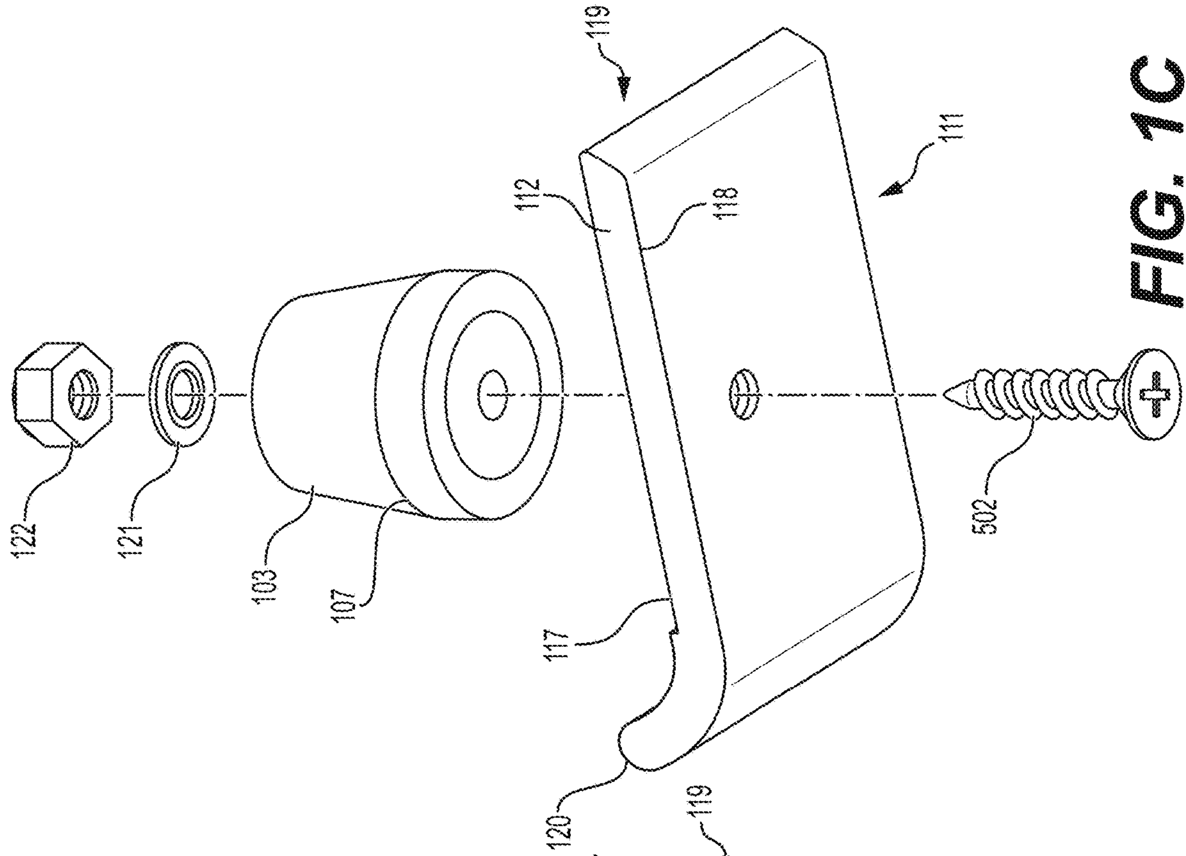
FIG. 1C shows a bottom view of an exploded glide in accordance with an embodiment of the present invention.
Figure 1B:
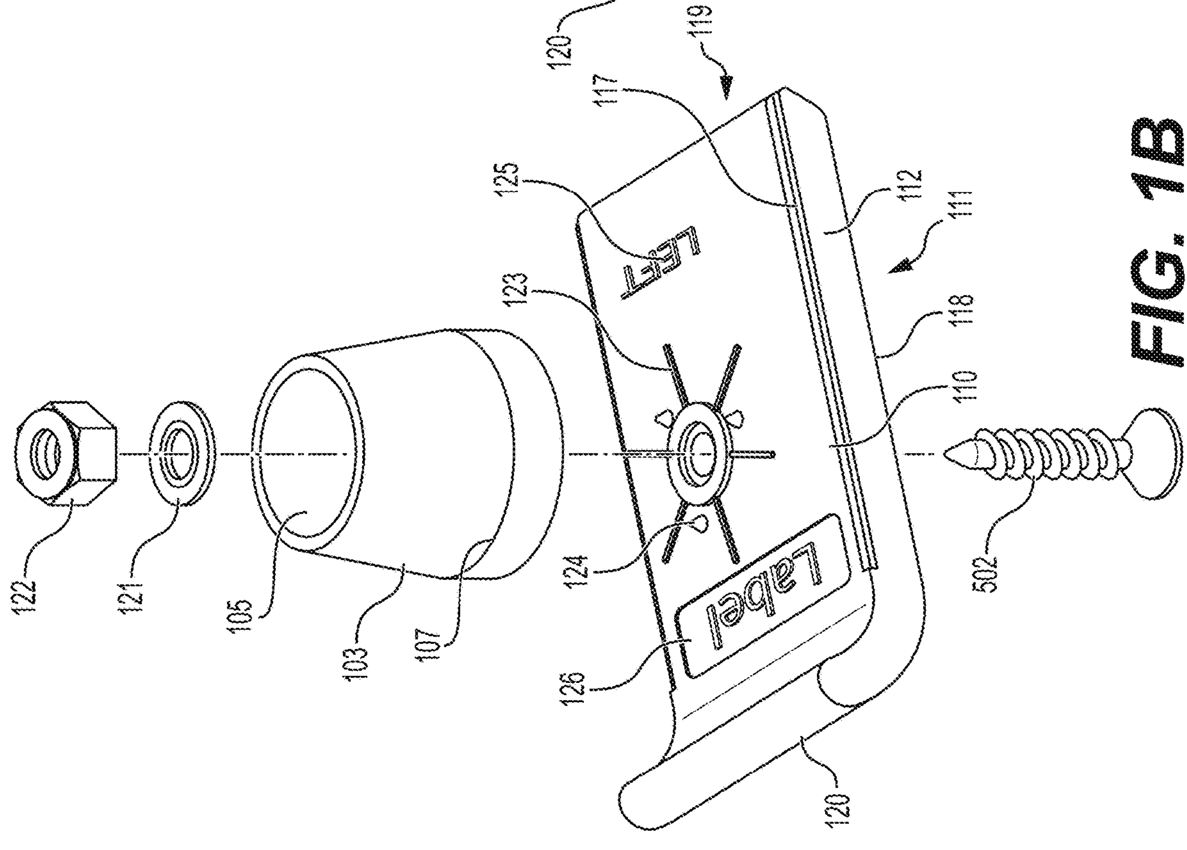
FIG. 1B shows a top view of an exploded glide in accordance with an embodiment of the present invention.

In certain embodiments, the sleeve 103 is attached to the seat 102 by tensile means with a screw 502, a washer 121, and a nut 122 which hold the sleeve in place as shown in FIGS. 1B and 1C. The top of the seat 102 may comprise one or more raised surfaces 123 or projections 124 to help ensure that sleeve 103 does not rotate with respect to the seat 102 once attached, which could inadvertently loosen their connection. A bottom of sleeve 103 may have corresponding recesses that match, receive, and/or mate with raised surfaces 123 or projections 124.

Figure 5:
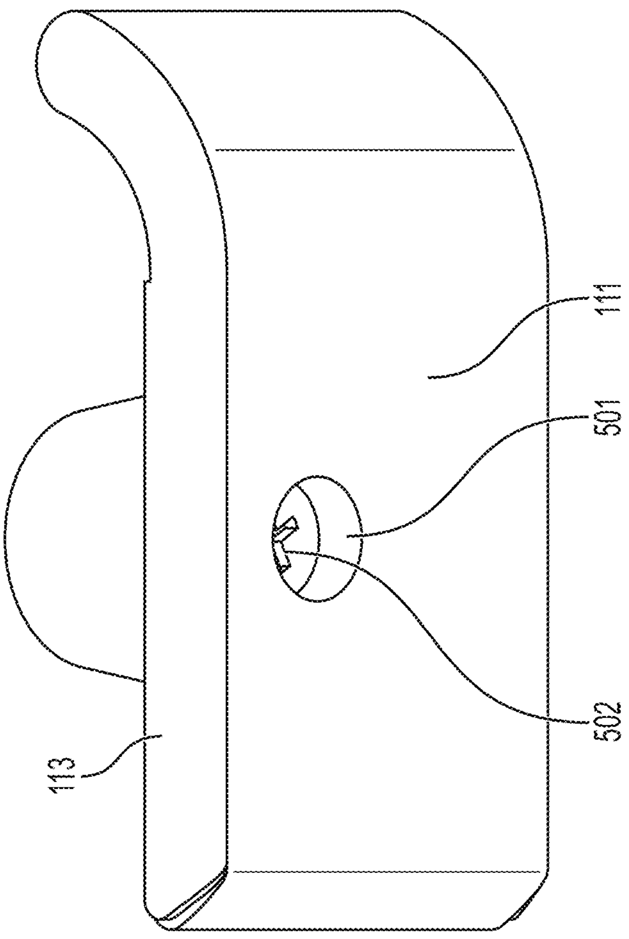
FIG. 5 shows a bottom perspective view of a glide in accordance with an embodiment of the present invention.

As shown in FIG. 5, the head of the screw is recessed within a cylindrical counterbore hole 501 (a hollow, flat-bottomed cavity) in the bottom surface 111 of the seat such that the head of the screw 502 does not protrude below the bottom surface of the seat and does not impede the seat from gliding on the ground. In other embodiments, a countersunk hole can be used instead of a cylindrical counterbore hole. In yet other embodiments, the seat and the sleeve may be attached by other means known in the art or can be fabricated from one piece of material. Furthermore, using methods known in the art, the sleeve can be fabricated in different colors.

Figure 2:
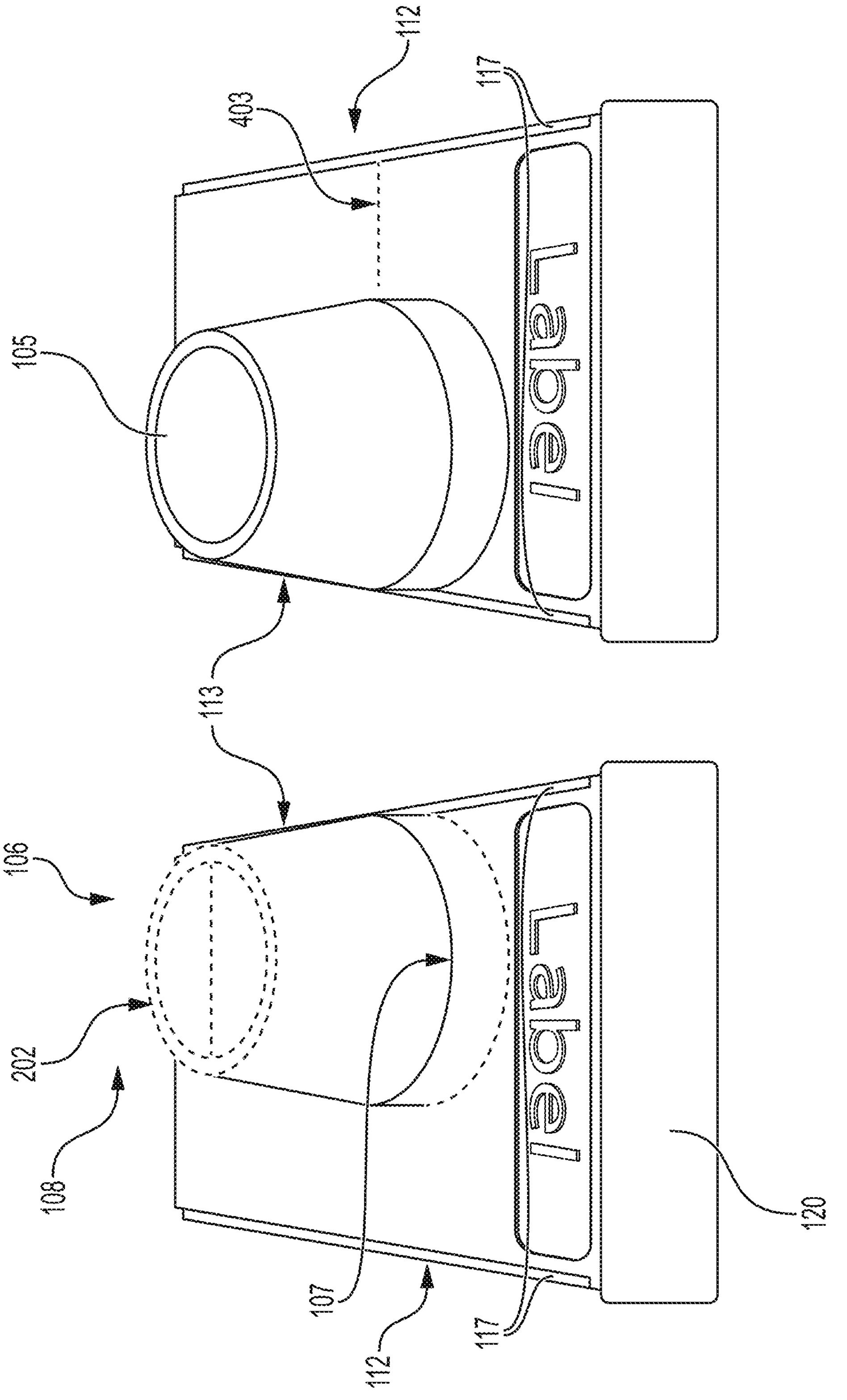
FIG. 2 shows a front elevation view of a pair of glides in accordance with an embodiment of the present invention on the rear legs of a walker.
Figure 3:
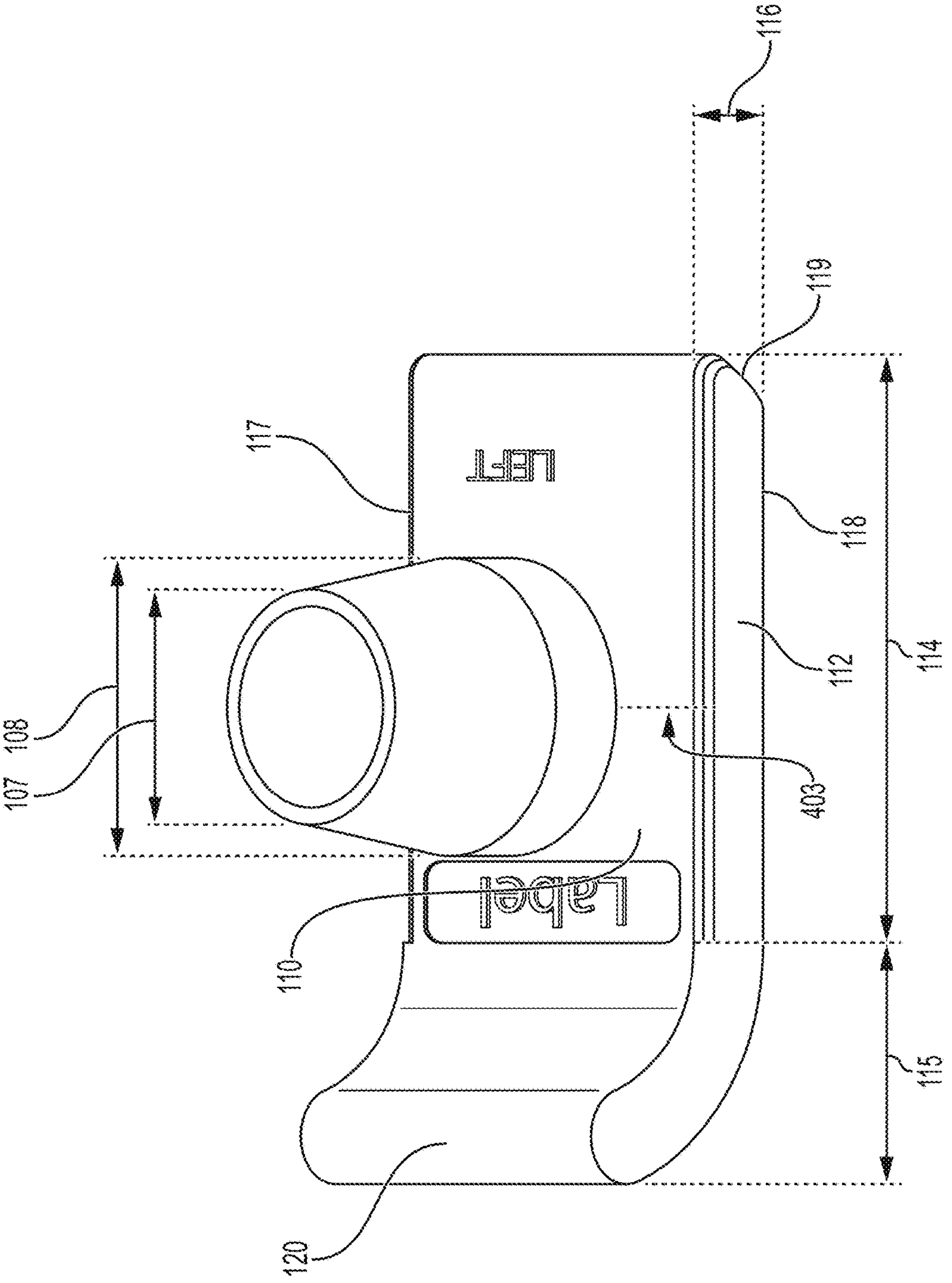
FIG. 3 shows a side elevation view of a glide in accordance with an embodiment of the present invention.
Figure 6:
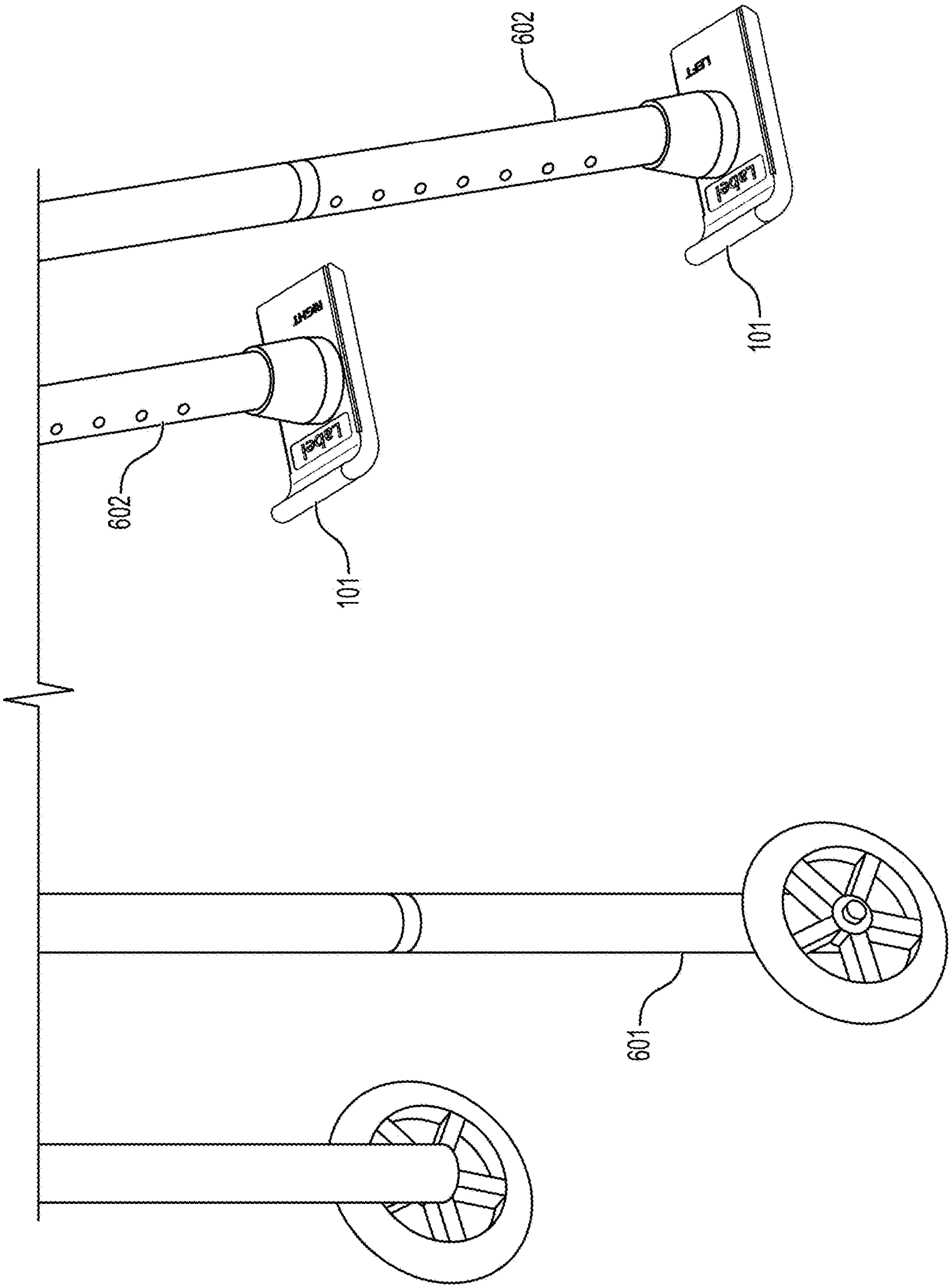
FIG. 6 shows a view of the pair of glides attached to an exemplary walker in accordance with an embodiment of the present invention.

In some embodiments, as shown in FIGS. 1A-4, the seat 102 has an elongated shape and comprises two portions: a larger flat portion 114, on top of which the sleeve 103 is positioned, and a front tip 115, which is raised upwards like a front tip of a ski. The front tip 115 of the seat allows the glide to negotiate gliding on uneven surfaces such as rugs, mats, thresholds, or doorsills. The front tip ends in a rounded edge 120. The flat portion 114 of the seat further comprises a top surface 110, a bottom surface 111, and three sides: a lateral side 112, a medial side 113, and a rear side 119. The bottom surface 111 of the flat portion of the seat provides a major surface of contact between glide and the ground. Along the flat portion of the seat, the lateral side 112 and the medial side 113 each have a height 116, a top edge 117, and a bottom edge 118. Furthermore, the rear side can be tapered towards the bottom. In certain other embodiments all sides may be tapered towards the bottom. As shown in FIGS. 2 & 6, when the glides are mounted on the rear legs 602 of a walker 601, the lateral side 112 faces towards the outside of the walker 601 and the medial side faces towards the inside of the walker 601. In a pair of glides, the lateral side 112 of a right glide faces to the right-hand side, and the lateral side 112 of a left glide faces to the left-hand side.

In certain embodiments, as shown in FIGS. 1A-4, the top surface 110 and the bottom surface 111 of the flat portion of the seat 114 are approximately parallel to one another, but in certain embodiments might be slightly angled to each other. Furthermore, the bottom surface 111 of the flat portion of the seat is sufficiently smooth to enable the seat 102 to glide on the ground. In one example, the flat part of the seat has the following dimensions: its top surface measures about 4 inches in length and about 2.5625 inches in width; its bottom surface measures about 3.75 inches in length and about 2.5625 inches in width; and its height measures about 0.375 inches.

In some embodiments, the top surface 110 comprises an indicator 125 and a label 126. The indicator 125 is text indicating which of the rear walker legs 602 the slides 101 should be placed on. As depicted in FIGS. 1A-1B, the indicators 125 are labeled with the text "left" and "right." The indicators 125 may part of the material forming slide 110 (e.g., raised or indented letters), may be an adhered label, or may be printed on top surface 110 as is known in the art.

Label 126 may be used to indicate a company logo, a name brand, a residence address, etc. In some embodiments, label 126 may be a plate that is inserted into a corresponding shaped recess in the top surface 110 via friction fit and is therefore removable or replaceable. A bottom surface of the label 126 may have an adhesive to better adhere within the recess. In other embodiments and similar to indicator 125, the label 126 may be part of the material forming slide 110 (e.g., raised or indented letters), may be an adhered label, or may be printed on top surface 110 as is known in the art.

Furthermore, as shown in FIG. 5, the bottom surface of the flat portion of the seat further features a cylindrical counterbore hole 501 to accommodate the recessed head 502 of the screw that fastens the sleeve 103 to the seat 102 thus allowing the bolt 122 to fit flush with or above the bottom surface of the seat 102. Coaxial with the cylindrical counterbore hole is a smaller cylindrical hole of that has a smaller diameter than that of the cylindrical counterbore hole. This smaller cylindrical hole extends through the seat and opens on the top surface of the seat and is configured such that the body and threads of said screw 502 snugly can fit within it.

In some embodiments, the seat 102 can be made of any suitable material known in the art that is sufficiently durable to slide across rough surfaces, such as concrete, without excessive wear and that is sufficiently smooth to easily slide across indoor surfaces, such as carpeting, tile, and wood floors, without damaging them. Examples of such materials include any polymer (a plastic) or similar material. In certain embodiments, the seat 102 can be made coated with another material, be made of multiple materials, or be made of a composite material such that the outside surfaces of the seat exhibit the desired durability and smoothness. In any embodiment above, the bottom surface 111 of the sleeve may be further polished for improving its ability to glide smoothly across various surfaces. Furthermore, known methods in the art can be used to fabricate the seat or portions of the seat in different colors.

Figure 4:
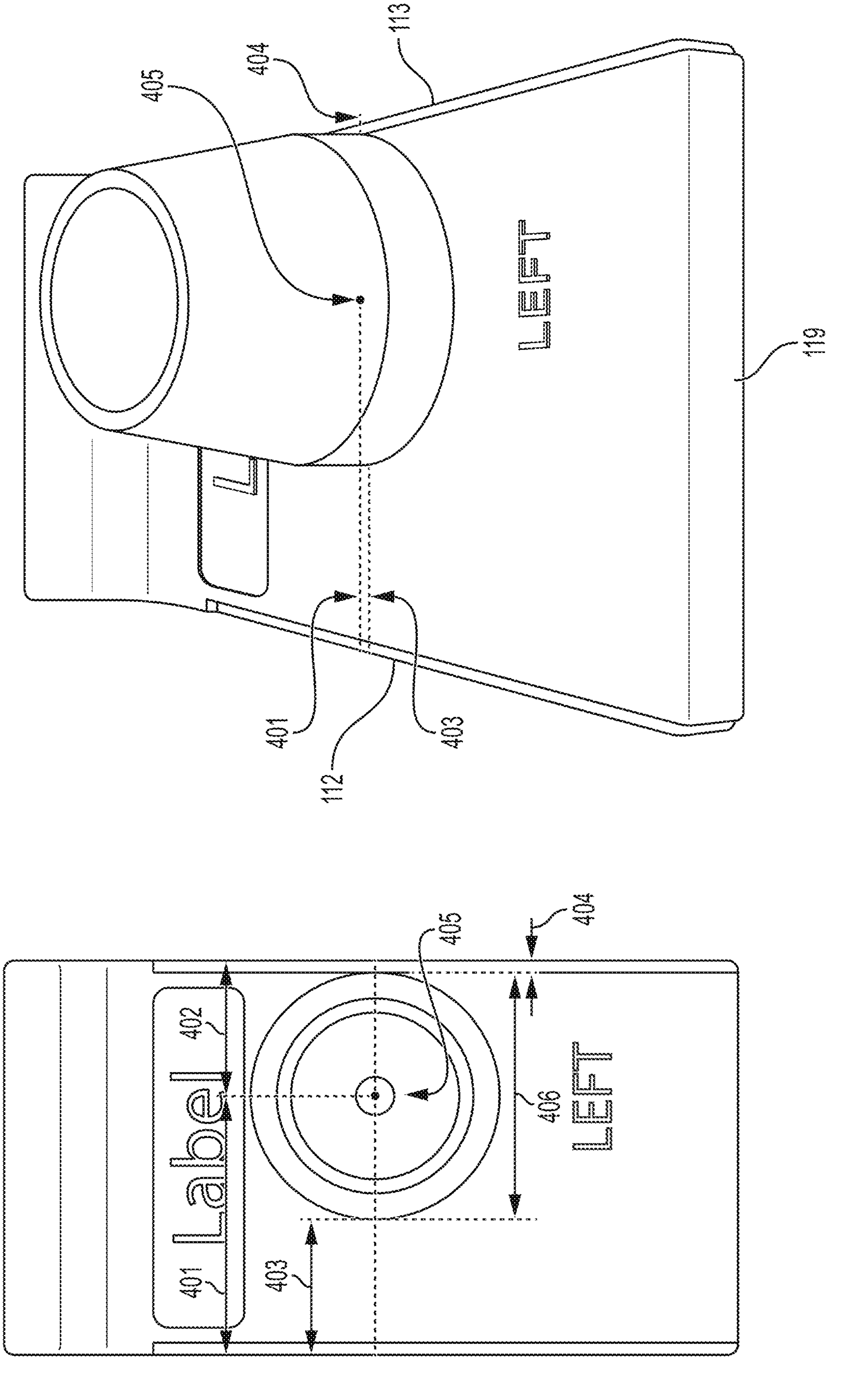
FIG. 4 shows a rear elevation view of a glide in accordance with an embodiment of the present invention on the rear legs of a walker.

In certain embodiments, as in any embodiment above, as shown in FIGS. 1A-4, the sleeve 103 is positioned closer to the medial side 113 of the seat than to the lateral side 112 of the seat. As shown in FIG. 4, a distance from the center point of the base 405 of the sleeve to the top edge of the lateral side of the seat 401 is greater than a distance from the center point of the base 405 of the sleeve to the top edge of the medial side of the seat 402. Due to this asymmetry or offset, the seat is characterized by a lateral width 403 as measured by the shortest distance between the top edge of the lateral side 112 and the bottom outer circumference of the sleeve 108. On the opposite side of the sleeve, the seat is characterized by a shorter corresponding medial width 404 as measured by the shortest distance between the top edge of the medial side 113 and the outer base circumference of the sleeve 108. In some embodiments, the seat may be characterized by absence of the medial width 404 due to the outer base circumference of the sleeve 108 extending all the way to the top edge of the medial side 113 of the seat. The ratio of the medial width 404 to the lateral width 403 can thus be in the range of 0/100 (total offset) to about 45/55 (less offset). More preferably, the ratio of the medial width 404 to the lateral width 403 can be in the range of about 0/100 to about 35/65. Most preferably, the ratio of the medial width 404 to the lateral width 403 can be in the range of about 0/100 to 25/75. In preferred embodiments the glides do not extend substantially in the lateral direction so as to not protrude beyond the width of the front wheels of the typical walker so as to not strike objects that were cleared by the front end of the walker. To achieve optimal stability enhancement, the lateral width should be in the range from about 0.5 inches to about 1.0 inch. As shown in FIG. 2, this side-to-side asymmetry provides enhanced stability to the walker. In one example, the distance from the center point of the base 405 of the sleeve to the lateral side of the seat 401 is about 1.6875 inches, the distance from the center point of the base 405 of the sleeve to the medial side of the seat 402 is about 0.875 inches, the lateral width 403 of the seat is about 0.875 inches, and the medial width 404 of the seat is about 0.0625 inches.

In certain further embodiments, variations of the glide having fewer or more than four sides are envisioned. For example, the glides might have five sides (instead of four sides) with the front corner of each lateral side diagonally "clipped." Furthermore, the sides may be straight and/or may be curved. For illustration, variations with three straight sides, three curved sides, or even two curved sides are possible. Furthermore, in other embodiments, the circumference of the seat may be defined by edges instead of sides. In such embodiments, the seat instead of having a flat portion, may have a conical shape or have a top surface defined by a plurality of polygonal faces that meet with the bottom surface at an angle thus defining the edges.

In some embodiments, as in any embodiment above, as shown in FIG. 2, the glides can be attached to the rear legs of a walker; however, in some walker designs they may also be attached to the front legs of a walker. Although the disclosure of the present invention is detailed and exact to enable those skilled in the art to produce the invention, the physical embodiments disclosed in this application merely exemplify the invention that may be embodied in other specific structures. While the preferred embodiment has been described, the details may be changed without departing from the invention, which is defined by the claims.

While specific embodiments of the invention have been described above, it will be appreciated that the invention may be practiced other than as described. The embodiment (s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The invention claimed is:

1. A glide configured for to be slidably mountable on a walker leg, the glide comprising:

a seat comprising:

a top surface;

a bottom surface;

a plurality of sides, wherein the plurality of sides further comprises a lateral side and a medial side; and a sleeve configured to slidably fit on the walker leg;

wherein the seat and the sleeve are configured relative to one another such that the sleeve is closer to the medial side than the lateral side.

2. The glide of claim 1, wherein the plurality of sides comprises at least four sides.

3. The glide of claim 1, wherein the seat is made of a polymer or plastic and the sleeve is made of rubber.

4. The glide of claim 1, wherein the sleeve accommodates the walker leg with a snug fit, and wherein the sleeve is coupled to the seat by a screw.

5. The glide of claim 4, wherein the walker leg is a rear walker leg of a walker.

6. The glide of claim 1, wherein the sleeve is made of a rubber.

7. The glide of claim 1, wherein the seat and the sleeve are made from one piece of material.

8. The glide of claim 1, wherein a distance between the sleeve and the lateral side is at least 0.5 inches.

* * * * *